US005924870A

United States Patent [19]

Brosh et al.

[11] Patent Number: 5,924,870
[45] Date of Patent: Jul. 20, 1999

[54] LENTICULAR IMAGE AND METHOD

[75] Inventors: Scott Brosh, Arlington; Phil Gottfried, Southlake, both of Tex.

[73] Assignee: Digillax Systems, Southlake, Tex.

[21] Appl. No.: 08/762,315

[22] Filed: Dec. 9, 1996

[51] Int. Cl.[6] .................... G09B 19/00

[52] U.S. Cl. .................... 434/365; 434/96; 434/97; 434/426; 40/436; 40/453

[58] Field of Search .................... 434/81, 84, 85, 434/90, 96, 100, 365, 426, 428; 40/427, 436, 437, 442–444, 451–454, 471, 476, 478, 488, 518

[56] References Cited

U.S. PATENT DOCUMENTS

Re. 35,029 8/1995 Sandor .
5,364,274 11/1994 Sekiguchi .
5,494,445 2/1996 Sekiguchi et al. .................... 434/365
5,695,346 12/1997 Sekiguchi et al. .................... 434/365

*Primary Examiner*—Glenn E. Richman
*Attorney, Agent, or Firm*—George R. Schultz; Akin, Gump, Strauss, Hauer & Feld, LLP

[57] ABSTRACT

The creation of computer generated lenticular images involves the computer manipulation of at least a first and second image. The images can be sequential in time of the same object or sequential in spatial perspective, or completely unrelated. The images are scanned into a computer memory and then digitally interlaced. The input can be any source of image. Likewise, the output can be manipulated to any resolution. The output interlaced image is then printed onto a substrate, such as the back surface of a lenticular lens. The resolution of the interlaced image can be matched to the geometry of the lenticules. Thus, the viewer will see the first image from a first viewing perspective and the second image from a second viewing perspective.

14 Claims, 6 Drawing Sheets

FRONT PERSPECTIVE

VIEW A
FIG. 5a
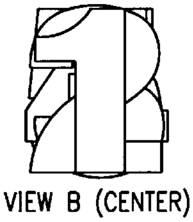
VIEW B (CENTER)
FIG. 5b
VIEW C
FIG. 5c
FIG. 6
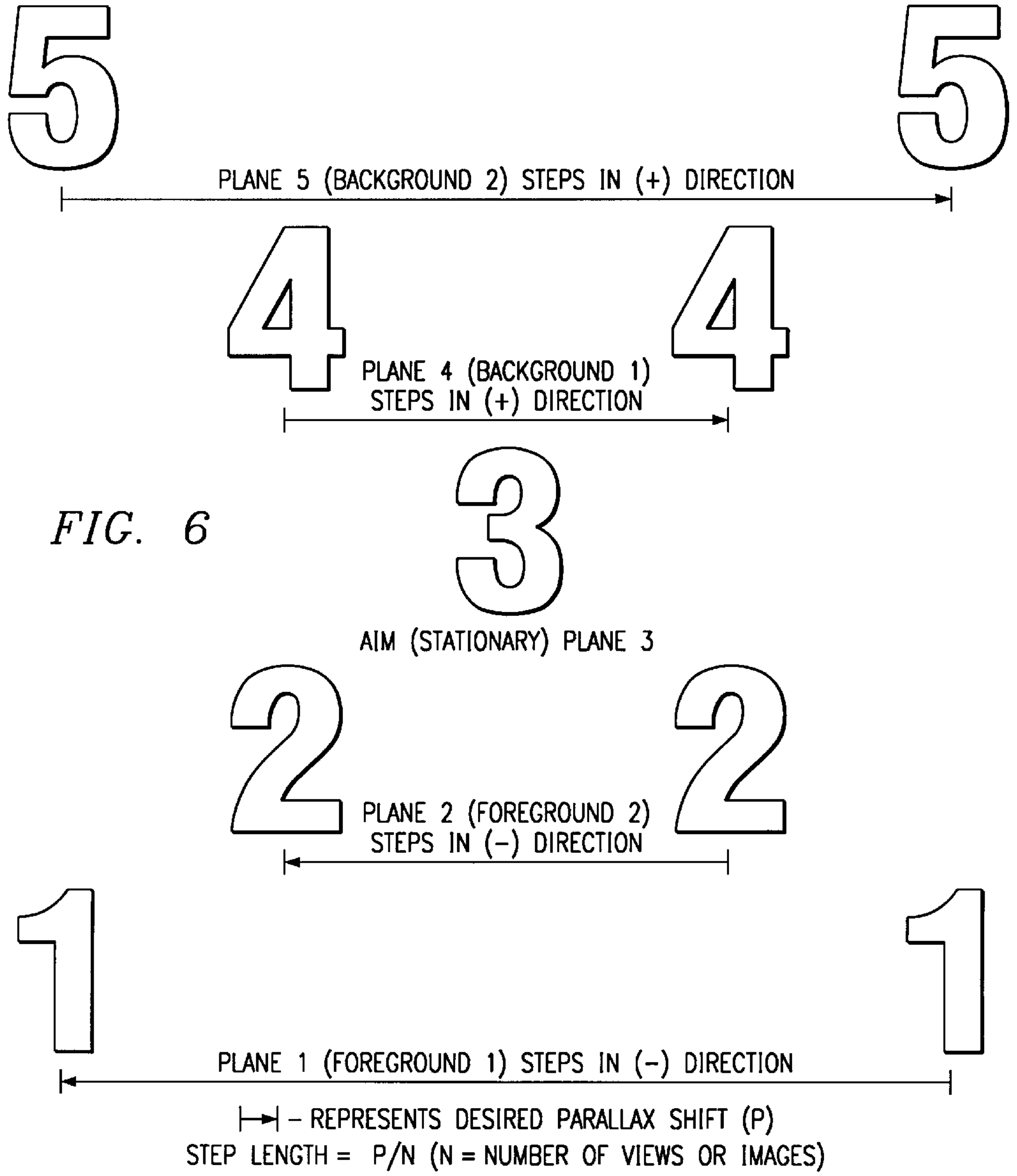

LENTICULAR IMAGE AND METHOD

TECHNICAL FIELD OF THE INVENTION

The present invention relates to a method of creating a three-dimensional or action lenticular image using a computer to manipulate the underlying images. The method involves the interlacing of the images for viewing under a lenticular lens.

BACKGROUND OF THE INVENTION

Three-dimensional holograms are eye-catching. They are useful in advertising almost any goods. For example, holograms can be incorporated into sports trading cards, inserts for CDs, on the face of tickets to verify authenticity or even on mouse pads used with computer pointing devices. However, holograms typically involve difficult photographic techniques that increase the price for the images. Thus, it is not presently economical to use holograms on many items. A need exists for a less expensive method of generating an image similar to a hologram. Such a method should create both three dimensional imagery or action sequences that move according to the viewing angle.

One method of creating an image is disclosed in U.S. Pat. No. 5,364,274 to Sekiguchi entitled "Process For Producing A Display With Movable Images." The Sekiguchi process involves generating at least two images with a computer. The first can be produced either by creating an original illustration or by scanning a desired image. The second image is created can be generated by electronically copying and subsequently altering and modifying the first image on the monitor. At least one and preferably all the images are then masked, electronically removing, erasing, canceling, or otherwise deleting a symmetrical pattern of spaces on the images to form masked images with a spaced array of stripes comprising viewable opaque portions with spaces positioned between the and separating the stripes. After masking, part of the masked image is overlayed, superimposed and combined upon each other in offset relationship so that the viewable strips of one image are positioned in the spaces of another image. The superimposed images are printed on an underlying web. A grid or sleeve can be placed in front of the superimposed images of the rearward web. Thus, the grid will reveal one image when positioned over the printed portions of the other constituents of the combined pattern. Movement of the grid will then reveal another image. Thus, the Sekiguchi method requires the mechanical manipulation of the grid over the underlying image.

Another method of producing an image is disclosed in Reissue U.S. Pat. No. 35,029 to Sandor et al. entitled "Computer Generated Autostereography Method and Apparatus." The Sandor method produces an "autostereographic image by inputting to a computer a predetermined number of planar images on an object. Each of the planar images is a view of an object from a different viewpoint. The computer then interleaves the images and then prints these onto a film. A spacer with a thickness is placed over the film. Finally a barrier strip having slits is placed over that spacer. The system requires the use of a off-axis projection to produce the three-dimensional image. If the image is to be viewed from a position (x,y,z) in front of the autostereograph, then a position (x',y',z') is determined on the film that will make that projection. Determination of that position is dependent on the thickness of the spacer and the width of the slits in the barrier strip. Thus, generation of the off-axis projection is calculation intensive. Further, the arrangement requires the use of several layers to create the autostereographic image.

A need exists for a method which produces a high-quality, inexpensive, and easily constructed images similar to holograms. The method should allow for the use of any quality of input. Further, it should allow for the production of the output image with any quality of output device. The method should eliminate unnecessary elements, thereby reducing the cost of the finished image.

SUMMARY OF THE INVENTION

The present invention relates to a method of creating a lenticular image with computers. The method can be used to produce three dimensional images as well as action images. For example, an action sequence can be produced by scanning in three sequential images of an actor in motion. The images are interlaced as described in more detail below. The interlaced images can then be printed onto a substrate such as the back surface of a lenticular lens. The present method matches the resolution of the interlaced image to the geometry of the lens. Thus, when the viewer views the image from different angles, he will see a transitioning of the sequential images. One viewing angle will produce an image through the lens of only one set of image information from the interlaced images. The next viewing angle will produce an output through the lens of another set of image information and so on.

Three dimensional lenticular images are produced in much the same way. However, instead of underlying images that are sequential in time, the three dimensional seen will have underlying image information that is sequential in space. In other words, the same three dimensional image is recorded from, for example, three differing perspectives. The three images are then interlaced with the assistance of a computer. The interlaced output image is dithered to produce a desired resolution and then printed onto a substrate. If the substrate is not the lens, then the lenticular lens is placed over the substrate. This method produces a result where the background and foreground portions of the underlying object appear to move in relation to the central portion of the object as the lenticular image is viewed from different angles.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIGS. 5*a*, 5*b*, and 5*c* illustrate the shifting effect created by the layering method of FIG. 4;

FIG. 6 illustrates the parallax shift of the images recorded in FIG. 4;

DETAILED DESCRIPTION OF THE DRAWINGS

Figure 1:
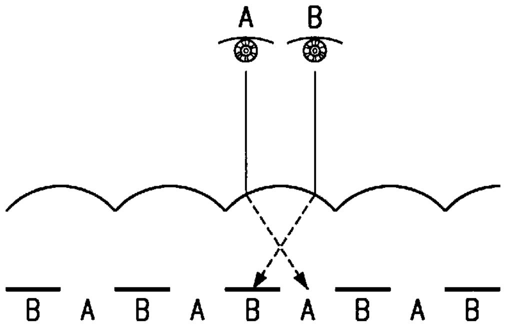
FIG. 1 is an illustration of a sectional view across the lenticular image showing a background image of interlaced A and B images covered by a lenticular lens.
Figure 2:
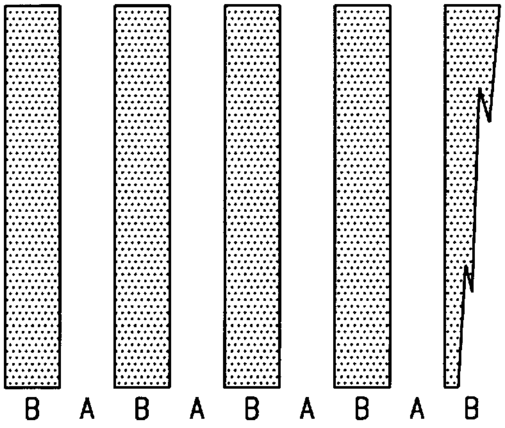
FIG. 2 is a top view of the A and B inputs interlaced.
Figure 3A:
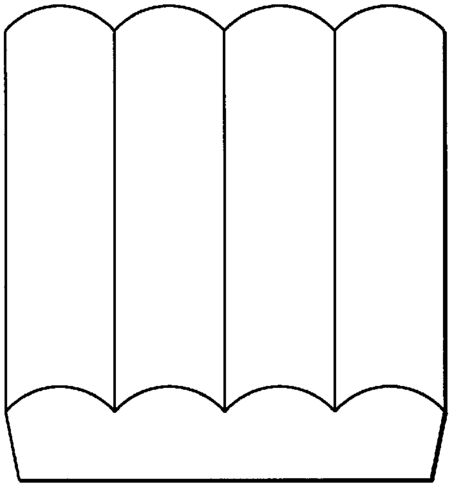
FIG. 3*a* is a view through the lenticular lens at an angle that only reveals input A.
Figure 3B:
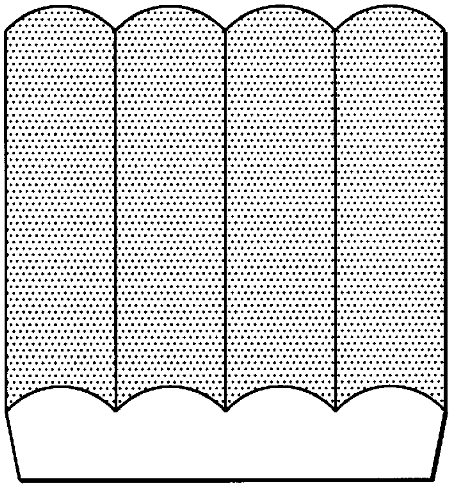
FIG. 3*b* is a view through the lenticular lens at an angle that only reveals input B.

The present method of creating a lenticular image or three-dimensional image overcomes many of the disadvantages found in the prior art. The method produces remarkable depth and clarity of image. Yet, the method is economical in comparison with earlier methods. FIGS. 1, 2, 3*a* and 3*b* illustrate the basic method of creating an lenticular image 10 from a first and second image 14, 16. The method involves the creation of an interlaced image 12 of at least two images. First image 14, also designated A, in this example is simply a white field, while second image 16, or B, is simply a black field. Both stored in a memory within a computer. The computer can then slice the images, essentially into strips and alternate them. In other words, the strips are recreated and printed onto a substrate. A lenticular lens is then placed over the printed substrate. From one viewing angle 2, only a white field A is observed due to the refractive effect of the lenticular lens 20. From a second viewing angle 4, only a black field B is seen by the viewer.

The underlying image can of course be significantly more complex than the simple black and white fields. For example, the appearance of action could be achieved using this method. If the first image is a batter preparing to swing his bat, then the second image could be the batter in mid swing. These images can be interlaced and placed under a lenticular lens. The viewer, depending on his viewing angle could see the batter from the first image, and then by moving his head or by moving the interlaced image, he could see the second image of the batter in mid swing. The transition between the first and second images can be minimized by adding additional views. In other words, this method is not limited to a single image. Instead many sequential shots can be interlaced to create the sense on action during viewing. Note, however, that the final interlaced image is approximately the same size as the two original images. During the interlacing process a certain amount of data or image is lost. The lost information affects the final resolution of the interlaced image.

A spacer is unnecessary in the implementation of the present method. Still, the geometry of the lenticular lens does matter. The lens has a plurality of hemi-cylindrical lens units. Each lens unit or lenticule has both a radius of curvature 22 and a pitch 24. It also has a lenticule thickness 26 and an overall thickness 28. These factors determine the angle 30 between the centers of the lenticules as measured from the rear surface. In one embodiment of the invention, a lenticular lens is used with a radius of curvature 22 of 0.009 inch and a pitch 24 of 0.015 inch. The lenticule thickness is 0.004025 inch and the overall thickness is 0.0225 inch. This results in a lobe angle 30 of 58 degrees. The resolution of image 12 is directly related to the geometry of the lenticular lens 20.

The relationship between image resolution and lenticular geometry can be illustrated with the following example. The pitch 24 is equal to the inverse of the frequency of lenticules per inch. In other words, if the pitch is 0.012 inch, then the frequency of the lenticules is 83.33 lenticules per inch. If twelve images are desired, then the resolution of the image will be 12 images times 83 lenticules per inch, resulting in a resolution requirement of 996 dots per inch (dpi). If the output device can only print at a resolution of 1000 dpi, then the image must be "dithered" to achieve the additional information. Dithering is an interpolation process which creates data within the stored data at values intermediate to values adjacent to the created data. The images can be stored in any suitable format.

Once the output interlaced image has been generated, it can be printed directly onto the back surface 32 of the lenticular lens 20. Alternatively, the image can be printed onto a substrate and a lenticular lens attached to it by adhesive. The lens can be made of any suitable optical material such as PTEG plastic and the printing is preferably done with a Heidelburg printing press. If the interlaced image is a color image, then it can be printed by color separations. For example, a cyan print can be laid down onto the plastic surface. The ink can then be cured with ultraviolet light prior to the printing of the next color separation, typically magenta. After the primary color separations are printed, a white backing layer can be applied over the entire interlaced image. The printing of the interlaced images can be done on any suitable output device, including laser printers and even ink jet printers. The term printing includes any method of producing an image including photographic techniques.

Figure 4:
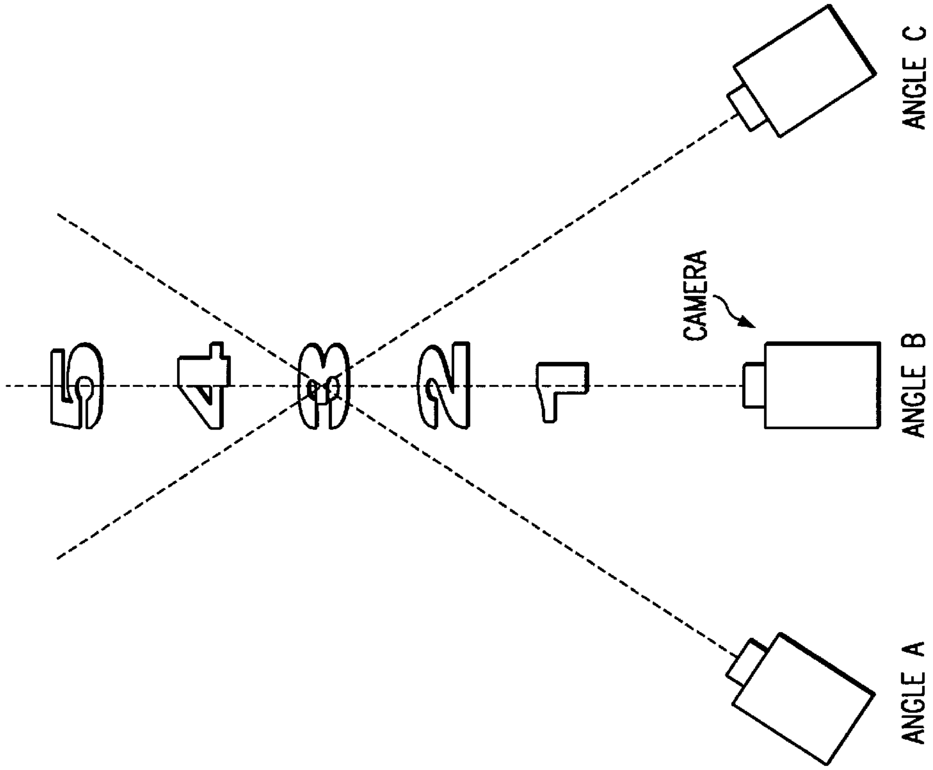
FIG. 4 illustrates the method of layering images to achieve a three-dimensional shifting effect.
Figure 3C:
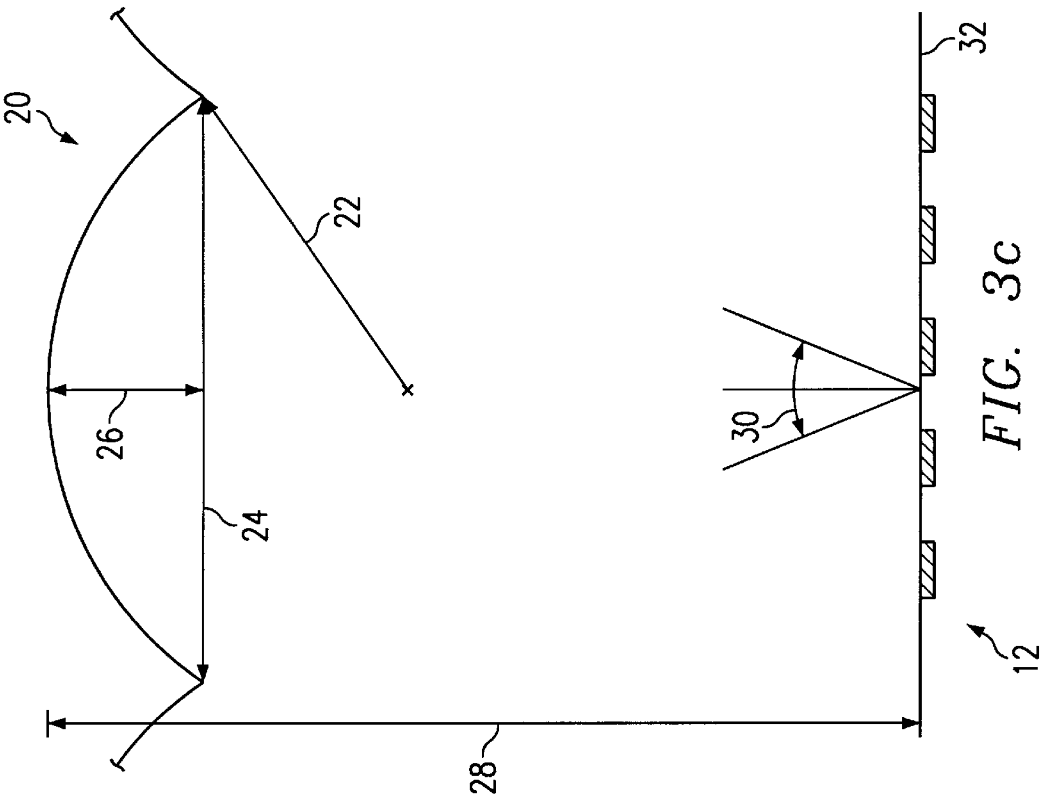
FIG. 3*c* is a cross-section of a lenticule.

The depth of an interlaced image can be improved with a stacking effect as illustrated in FIGS. 4, 5, and 6. In FIG. 4, three cameras 40, 42, and 44 take an image of five layers from different perspectives. In each case, the cameras center the image of the third layer. The resulting input images are then interlaced as described above. However, as illustrated, the center image is maintained in the center of each perspective shot. Further, shots 40*a* and 44*a* should be symmetric about shot 42*a*. FIGS. 5*a*, 5*b* and 5*c* illustrate the image captured by each camera 40, 42, and 44 respectively. The image in the example is centered on the number 3 which is the center layer of the five layers. The image could easily be any three dimensional object. The numbered layers simply illustrate the concept of the layered nature of any three dimensional object. Notice that the number five appears on the far left for the image from camera 40. In contrast, it is on the far right in the image from camera 44. When the images are interlaced, there is a parallax shift between the images 40*b* and 44*b*. The greater this parallax shift results in a greater sense of depth in the picture. While the action scenes described above use images that are sequential in time, the three dimensional shots are, in essence, sequential in space.

Figure 7A:
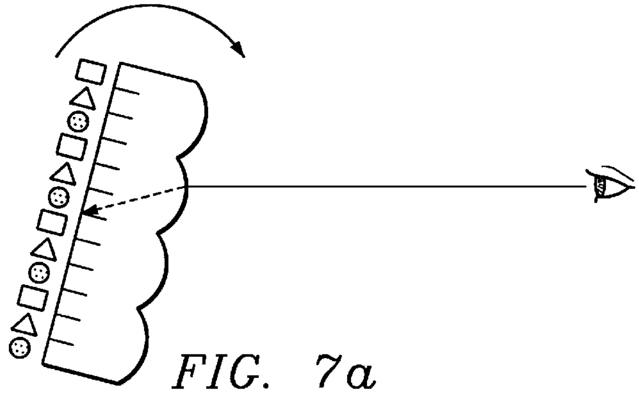
FIGS. 7, 8 and 9 illustrates how different images are seen based upon the shifting of the viewer's perspective.
Figure 7B:
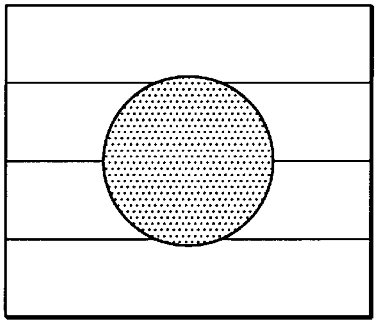
Figure 8A:
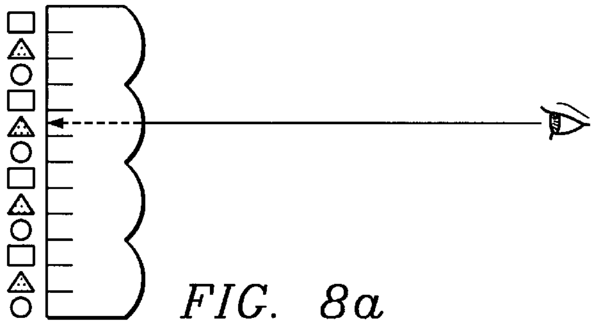
Figure 8B:
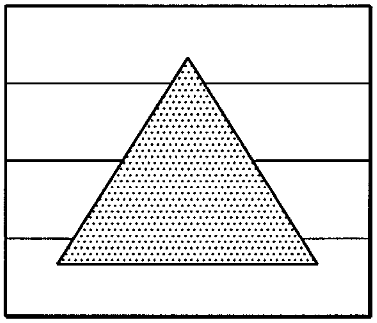
Figure 9A:
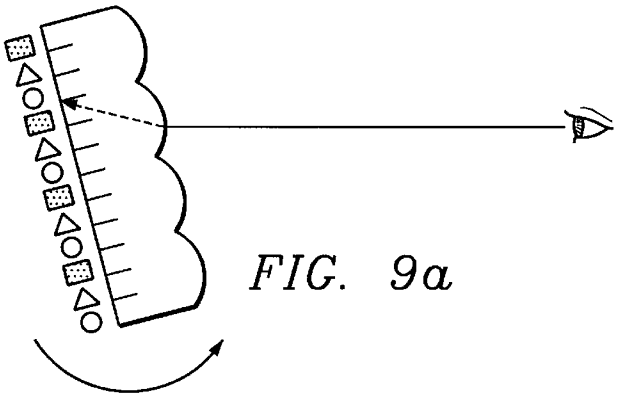
Figure 9B:
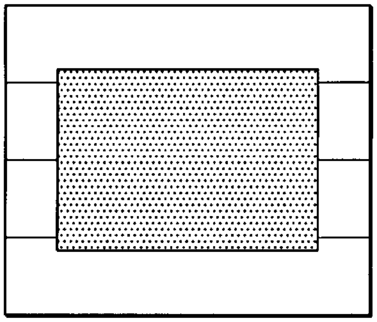

FIGS. 7, 8 and 9 illustrate the importance of viewing angle and distance to the final image perceived by the viewer. When the lenticular image is viewed from a first perspective 50, such as shown in FIG. 7*a*, the viewer will only see 50*a* the circle image data that is alternatingly interspersed in the interlaced image 12. Likewise, when the image is viewed from a second perspective 52, only the image 52*a* of the triangle image data is detected from the interlaced image 12 on the back surface of the lenticular image. Finally, from a third perspective 54, only the square image data 54*a* is visible to the viewer. It is important to note that the axis of the lenticules is parallel to the axis of the interlaced image elements. Further, it is important to note that the viewing angle is affected by the distance between the lenticular image and the viewer. Thus, in certain applications, an optimal lenticular geometry can be developed if the viewing distance is known. For example, if the lenticular image were placed on the ordering menu at a fast food restaurant, the relevant distance would be the distance between the counter and the menu.

Figure 10:
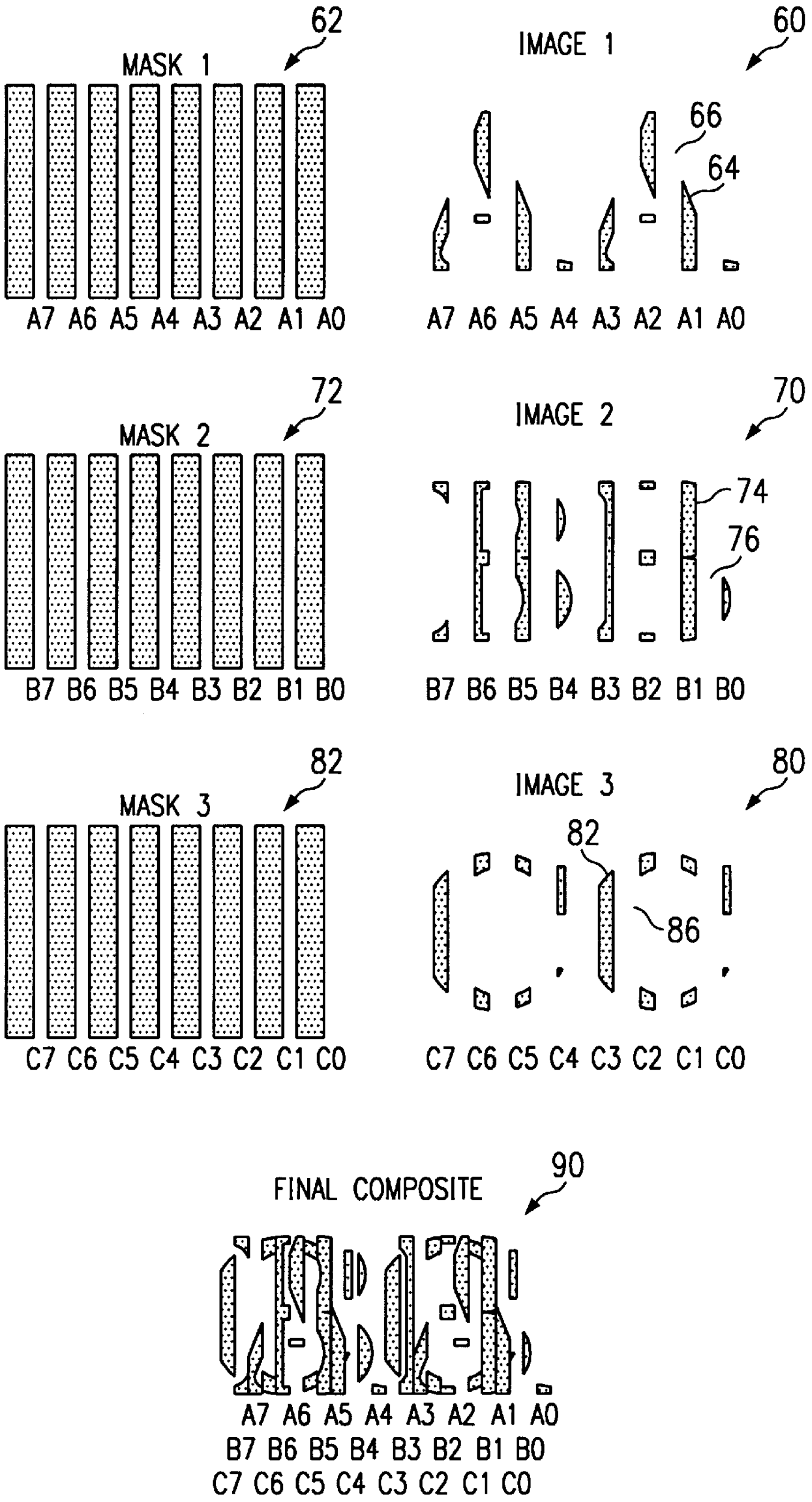
FIGS. 10 illustrates a method of interlacing three images without offsetting the mask used to create the strip information from the original images.
Figure 11:
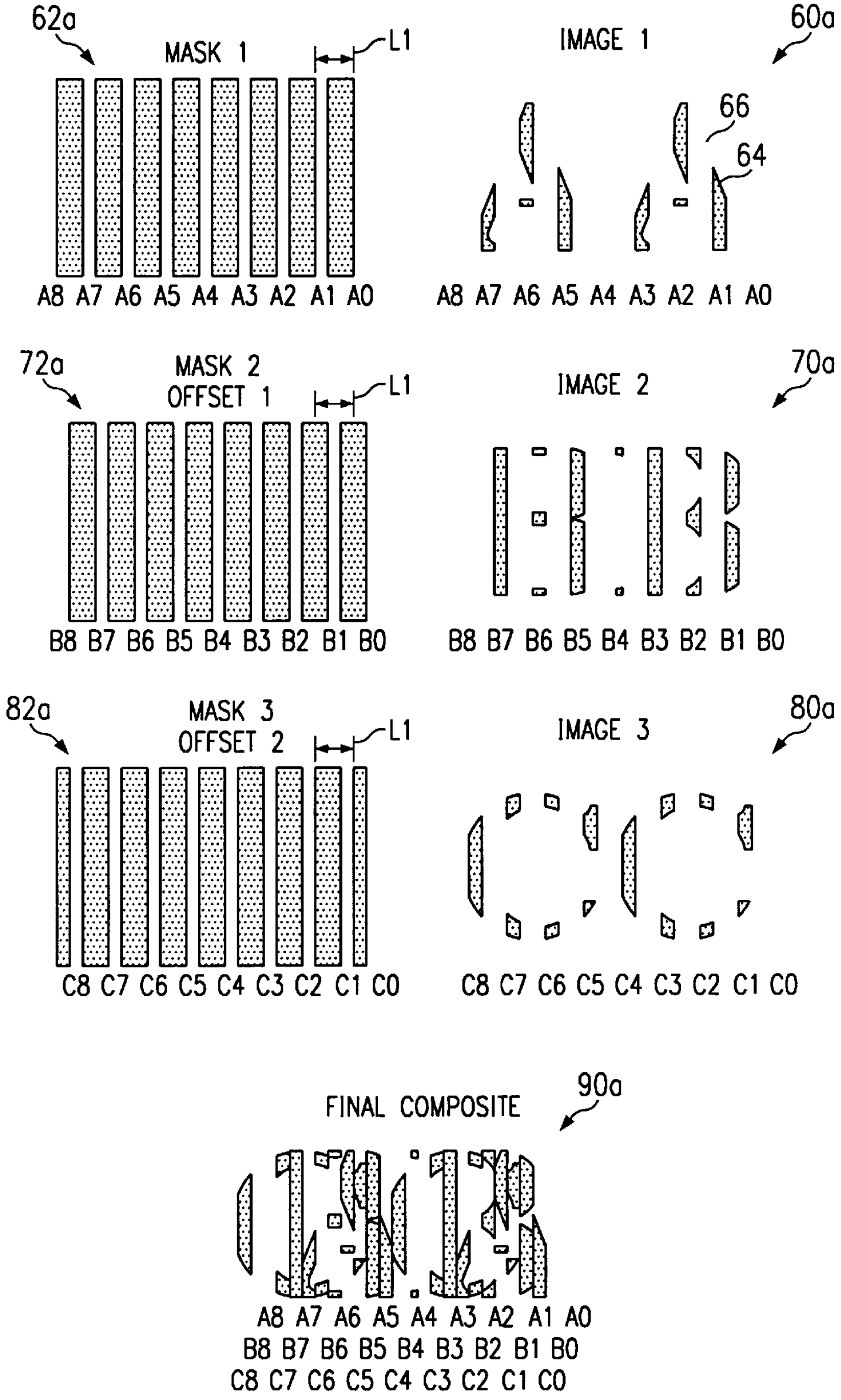
FIG. 11 illustrates a method of interlacing three images while offsetting the mask used to create the strip information from the original images.

The order in which the interlacing occurs has a direct impact upon the quality of the lenticular image. One method is shown in FIG. 10. Three images 60, 70, 80 will be interlaced into a final output 90 over which a lenticular lens will be placed. The first image 60 is essentially masked by a mask 62. The mask 62 has both clear and opaque striping. As three images are being pared to only one composite, the mask will cover two thirds of the image, while one third will be saved for interlacing. Thus, only a portion 64 of the underlying image 60 remains with the remainder discarded. The portions 64 that remain from each image have been referenced A0 to A7 from right to left. Likewise, second and third images 70, 80 have been masked with the second and third masks 72, 82 leaving portions 74, 84, referenced as B0 to B7 and C0 to C7. Remaining image information 76, 86 are discarded. This raw image data 64, 74, 84 is then interlaced into a final composite 90. In a preferred embodiment, the final embodiment is also interlaced from left to right. As shown the strips of image data have been laid down from right to left with A0, B0, and C0 forming the furthest stripe to the right of the final composite image 90. The next stripe includes A1, B1, and C1, then A2, B2, and C2 until concluded with A7, B7, and C7. The final image should be composed from right to left if the parallax shift of the foreground images 40*d*, 44*d*, shown in FIG. 6, shift from right to left. Experience has shown that failure to orient the interlacing in the same direction of the foreground parallax shift results in a "pseudo" image. In other words, after the lenticular lens is placed over a pseudo composite, the background will appear in the foreground of the three dimensional image. It should be noted that the masking and interlacing process are preferably done electronically.

A further refinement of the process involves offsetting the mask used to pare the original image. Because of the cylindrical nature of the lenticular lens, steep curves in the original image will result in a stair step effect on the lenticular image. Better image quality has been achieved by offsetting the mask between the first, second, and third images. For example, the mask 62 has a first lenticular width, designated L1, where the leftmost one third is open. Mask 72*a* has been offset so that the middle third of the lenticular width L1 is clear. Likewise, the mask 82*a* has the right most third clear. This produces a slightly different composite 90*a*.

Figure 12:
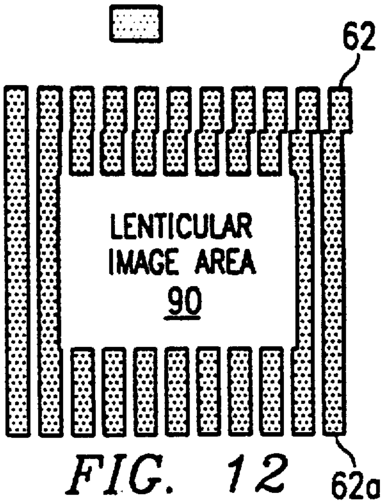

As alluded to above, the alignment of the lenticular lens to the interlaced image of crucial to the quality of the lenticular image. A misalignment will cause a blurred and confused image. To complicate the matter, not all lenticular lens are accurately made. In other words, one lens might be billed as having 66 lenticules per inch, but actually have 66.2 lenticules per inch. However, if the interlaced image has been sized electronically to suit a 66 lenticule/inch lens, then the image will have a blurred image increasing from left to right with the cumulative error. Therefore, an initial print can be prepared with mask information as a border, as shown in FIG. 12. The lenticular image area 90 is generally bounded with an unaltered mask 62 and a sized mask 62*a*. During the sizing process described above, the lenticular image area may need to be altered in width to match the lens specifications. The mask information 62*a* is similarly sized. Thus, if the lens is accurately formed, then the mask image 62*a* should be either all black or all white depending upon the viewing angle. Further, if the lens is not properly aligned with the mask information 62*a*, a diagonal striping will occur along the side and bottom boundaries. The unsized mask 62 will produce a repetitive interference pattern through the lens. In other words, the cumulative error will produce a predictable vertical stripe pattern along the upper boundary. For example, a particular percent difference between the sized and unsized mask information might generate four distinct black bands on the upper boundary. This simple check allows an unskilled laborer to visually check the lens. If it generated five bands, then he will know that the lens does not have the desired number of lenticules per inch. Further, the upper band 62 can also reveal additional quality control information about the lenticular image. The black is formed by the combination of several primary color inks. If these inks have not been laid down exactly, the lenticules above the upper boundary 62 might reveal a blue or yellow hint, or any other color used in the printing. The lenticular lens will have magnified even a minor misalignment in the printing. If an error in the lens is detected, the lenticular image can be adjusted to match the actual dimensions of the lens. This quality control method allows for easy detection of lens misalignment, deviations form expected lens dimensions, and printing errors in the composite image.

The present method can manipulate input images of any resolution and produce output suitable for any resolution device. Further, the method allows for the sizing up or down of the images. Matching the interlaced image to a output device and lenticular lens involves several steps best illustrated by example. For purposes of the example, the input comprises twelve images with a resolution of 640 pixels wide by 480 pixels high. The lenticular lens will have 66.66 lenticules per inch. Each image will be 8.8 inches wide and 6.6 inches high. During the interlacing, each image would be converted to 792 pixels or dots per inch, i.e. 66 times 12, resulting in a composite image that is 8.8 inches wide by 6.6 inches high at 792 dots per inch resolution. The composite image resolution is changed to match the resolution of the output device. This resolution change can be more dots per inch or less, although more is preferred. It is also important that the width and height of the image does not change during this resolution change. If the output device has a print resolution of 1000 dots per inch, an additional 208 dots per inch must be generated by dithering, an interpolative process. The output device matched image is further processed to match the lenticular lens by making an adjustment to the size of the image. For instance, referring to FIG. 12, the size adjusted mask 62*a* may be only 98% the size of the original mask information 62. Likewise, the composite image has been sized down to match the lens dimensions.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of steps without departing from the spirit of the invention. Accordingly, the present invention is intended to encompass such rearrangements, modifications, and substitutions of steps as fall within the scope of the appended claims.

We claim:

1. A method of producing a lenticular image comprising the steps of:

(a) interlacing a first and second image stored in a memory; and (b) printing said interlaced image on a bottom surface of a lenticular lens.

2. The method of claim 1 wherein step (a) comprises:

(a) scanning the first image into a memory;

(b) scanning the second image into a memory;

(c) creating an interlaced output image with the first and second images wherein the interlaced image includes a plurality of alternating strips of predetermined width of said first and second images.

3. The method of claim 1 wherein step (b) comprises printing said interlaced image onto a lenticular lens.

4. The method of claim 3 wherein step (b) comprises applying a backing under said image.

5. The method of claim 4 further comprises applying an opaque backing.

6. The method of claim 1 wherein said step (a) comprises interlacing first and second images which are sequential in time.

7. The method of claim 1 wherein said step (a) comprises interlacing first and second images which are sequential in space.

8. The method of claim 2 wherein step (c) comprises dithering the interlaced image to a predetermined resolution.

9. The method of claim 7 further comprises recording the first image of a three dimensional object from a first perspective and recording the second image of the three dimensional object from a second perspective.

10. A lenticular image comprising an interlaced image printed on a surface of a lenticular lens.

11. The lenticular image of claim 10 wherein said interlaced image comprises:

(a) a first image; and (b) a second image, wherein the first and second images have been digitally rendered into strips of predetermined width and alternatingly combined.

12. The lenticular image of claim 10 wherein said lenticular lens comprises a generally planar transparent sheet having an upper surface with hemi-cylindrical lens elements and a bottom surface.

13. The lenticular image of claim 11 wherein said first image is an object at a first point in time, and the second image is the object at a second period in time.

14. The lenticular image of claim 11 wherein said first image is an object from a first perspective and the second image is the object from a second perspective.

* * * * *

UNITED STATES PATENT AND TRADEMARK OFFICE

CERTIFICATE OF CORRECTION

PATENT : 5,924,870

DATED : July 20, 1999

INVENTOR(S) : Scott Brosh and Phil Gottfried

It is certified that error appears in the above-identified patent and that said Letters Patent is hereby corrected as shown below:

On the title page, "6 Drawing Sheets" should be --7 Drawing Sheets--.

In the drawings, add the drawing Sheet 7 of 7, consisting of Fig. 12, as shown on the attached page.

Insert at Column 3, line 7, --Fig. 12 illustrates an initial print with mask Information as a border.--.

Signed and Sealed this

Tenth Day of April, 2001

*Attest:*

Nicholas P. Godici

NICHOLAS P. GODICI

*Attesting Officer*

*Acting Director of the United States Patent and Trademark Office*